United States Patent
Jiang et al.

(10) Patent No.: US 12,293,102 B2
(45) Date of Patent: May 6, 2025

(54) METHOD, DEVICE, AND COMPUTER PROGRAM PRODUCT FOR DE-DUPLICATING DATA

(71) Applicant: Dell Products L.P., Round Rock, TX (US)

(72) Inventors: Changxu Jiang, Chengdu (CN); Chen Gong, Beijing (CN); Fei Wang, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 69 days.

(21) Appl. No.: 18/215,414

(22) Filed: Jun. 28, 2023

(65) Prior Publication Data

US 2024/0211154 A1  Jun. 27, 2024

(30) Foreign Application Priority Data

Dec. 22, 2022  (CN) .......................... 202211658388.5

(51) Int. Cl.
  *G06F 3/06*  (2006.01)
(52) U.S. Cl.
  CPC .......... *G06F 3/0641* (2013.01); *G06F 3/0608* (2013.01); *G06F 3/0683* (2013.01)
(58) Field of Classification Search
  CPC .... G06F 3/0608; G06F 3/0641; G06F 3/0647; G06F 3/067; G06F 3/068; G06F 3/0683
  See application file for complete search history.

(56) References Cited

U.S. PATENT DOCUMENTS

| | | | |
|---|---|---|---|
| 9,952,808 B2 | 4/2018 | Kaushik | |
| 9,996,270 B2 | 6/2018 | Guo et al. | |
| 10,635,315 B1 * | 4/2020 | Armangau | G06F 3/0641 |
| 10,678,435 B2 * | 6/2020 | Swift | G06F 3/0608 |
| 10,705,733 B1 * | 7/2020 | Smaldone | G06F 3/067 |
| 11,561,714 B1 * | 1/2023 | Mertes | G06F 3/0604 |
| 2014/0115258 A1 * | 4/2014 | Week | G06F 16/1752 711/163 |
| 2020/0341670 A1 * | 10/2020 | Zhang | G06F 3/0608 |
| 2022/0091738 A1 | 3/2022 | Patil et al. | |

* cited by examiner

*Primary Examiner* — Aracelis Ruiz
(74) *Attorney, Agent, or Firm* — BainwoodHuang

(57) ABSTRACT

Techniques for de-duplicating data involve: determining a target physical block in a first storage device. The techniques further involve: determining a compression ratio of a target data block in a plurality of data blocks to be transferred. The techniques further involve: determining a target hash value of the target data block in response to the compression ratio being lower than a threshold compression ratio. The techniques further involve: determining a de-duplication operation for the target data block based on the target hash value and a de-duplication hash table, the de-duplication hash table storing hash values of data blocks that have been transferred from the first storage device to the second storage device. Accordingly, the amount of data that needs to be transferred can be reduced, and the storage space of the storage devices can be improved, thus increasing the resource utilization and improving the user experience.

20 Claims, 5 Drawing Sheets

METHOD, DEVICE, AND COMPUTER PROGRAM PRODUCT FOR DE-DUPLICATING DATA

CROSS-REFERENCE TO RELATED APPLICATION

This application claims priority to Chinese Patent Application No. CN202211658388.5, on file at the China National Intellectual Property Administration (CNIPA), having a filing date of Dec. 22, 2022, and having "METHOD, DEVICE, AND COMPUTER PROGRAM PRODUCT FOR DEDUPLICATING DATA" as a title, the contents and teachings of which are herein incorporated by reference in their entirety.

TECHNICAL FIELD

Embodiments of the present disclosure generally relate to the field of data processing, and in particular, to a method, a device, and a computer program product for de-duplicating data.

BACKGROUND

With the development of technology, more and more high-performance storage devices, such as solid-state drives (SSDs), are used to store data. Although high-performance storage devices can improve the access efficiency of data and reduce access time, high-performance storage devices are costly. In order to balance cost and access speed, more and more hybrid storage systems are used to provide data storage services to users.

Hybrid storage systems have hybrid types of drives: low-performance high-capacity lower-level storage devices, such as hard disk drives (HDDs), and high-performance upper-level storage devices, such as flash memories or SSDs. While hybrid storage systems can well balance cost and processing rates of users, there are many issues that need to be addressed in the process of working with hybrid storage systems.

SUMMARY OF THE INVENTION

Embodiments of the present disclosure provide a method, a device, and a computer program product for de-duplicating data.

According to a first aspect of the present disclosure, a method for de-duplicating data is provided. The method includes: determining a target physical block in a first storage device, a plurality of data blocks in the target physical block being to be transferred to a second storage device. The method further includes: determining a compression ratio of a target data block in the plurality of data blocks. The method further includes: determining a target hash value of the target data block in response to the compression ratio being lower than a threshold compression ratio. The method further includes: determining a de-duplication operation for the target data block based on the target hash value and a de-duplication hash table, the de-duplication hash table storing hash values of data blocks that have been transferred from the first storage device to the second storage device.

According to a second aspect of the present disclosure, an electronic device is provided. The electronic device includes at least one processor; and a memory coupled to the at least one processor and having instructions stored thereon, wherein the instructions, when executed by the at least one processor, cause the device to execute actions including: determining a target physical block in a first storage device, a plurality of data blocks in the target physical block being to be transferred to a second storage device; determining a compression ratio of a target data block in the plurality of data blocks; determining a target hash value of the target data block in response to the compression ratio being lower than a threshold compression ratio; and determining a de-duplication operation for the target data block based on the target hash value and a de-duplication hash table, the de-duplication hash table storing hash values of data blocks that have been transferred from the first storage device to the second storage device.

According to a third aspect of the present disclosure, a computer program product is provided, which is tangibly stored on a non-volatile computer-readable medium and includes machine-executable instructions, wherein the machine-executable instructions, when executed, cause a machine to perform steps of the method in the first aspect of the present disclosure.

BRIEF DESCRIPTION OF THE DRAWINGS

By more detailed description of example embodiments of the present disclosure with reference to the accompanying drawings, the above and other objectives, features, and advantages of the present disclosure will become more apparent, where identical reference numerals generally represent identical components in the example embodiments of the present disclosure.

In the drawings, identical or corresponding numerals represent identical or corresponding parts.

DETAILED DESCRIPTION

Figure 1:
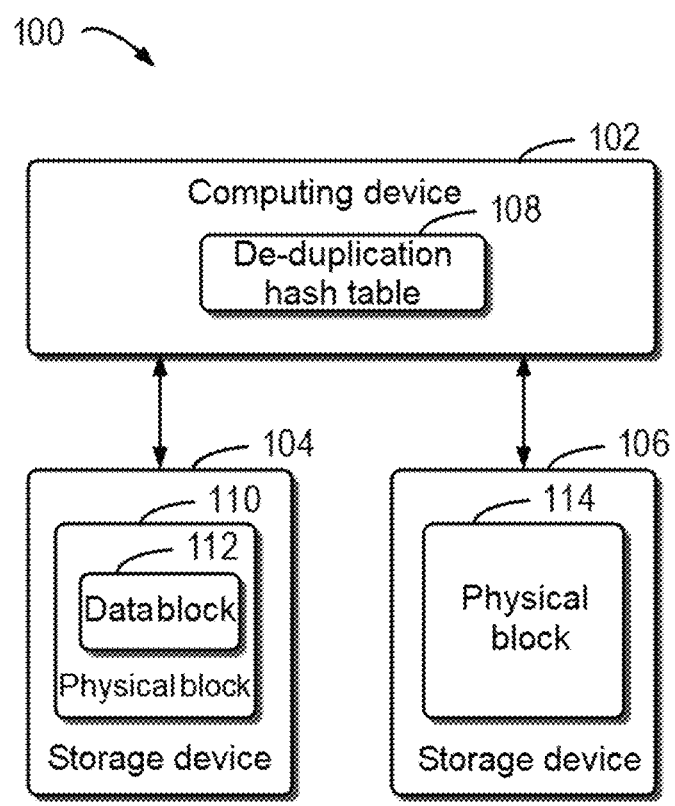
FIG. 1 illustrates a schematic diagram of an example environment in which a device and/or a method according to embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described in more detail below with reference to the accompanying drawings. Although the accompanying drawings show some embodiments of the present disclosure, it should be understood that the present disclosure can be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of the embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

As described above, hybrid storage devices that include storage devices with different storage speeds are increasingly applied to storage of data. When an upper-level storage device has sufficient capacity, user data can be written directly into the upper-level storage device, thus improving data writing performance. As the consumption of space increases, user data should be moved out from the upper-level storage device to a lower-level storage device to make room for hotter data, metadata, and newly received written data. A downward transfer of data is the process of moving the user data from a high-performance upper-level storage device to a lower-performance lower-level storage device. Considering that both the ratio of data reduction and the writing performance are critical in hybrid storage, the amount of data moved to the lower-level storage device during data transfer should be minimized.

Before transferring data to the lower-level storage device, it is necessary to reduce the data to be transferred. In order to better reduce the data to be transferred, deep compression is applied, which is an overall group compression of a group of data blocks while transferring data to the lower-level storage device. If the group compression satisfies a compression threshold, the group-compressed data are written to a physical space together, for example, by compressing a plurality of data blocks at a time. However, the group-compressed data have the following drawbacks. When there is any invalid data block to be used for space recovery of data blocks, a complex process of "decompression-deletion of invalid-concatenation-recompression" is required. In addition, random and small user data read streams may be somewhat affected by the decompression overhead, and the compression speed may be reduced when large data blocks are compressed.

At least to address these and other potential problems, an embodiment of the present disclosure provides a method for de-duplicating data. A computing device first determines a target physical block in an upper-level storage device for which data transfer is to be performed, and then determines a compression ratio of a target data block from a plurality of data blocks of the target physical block. If the compression ratio of this target data block is lower than a threshold compression ratio, the computing device determines a target hash value of the target data block. The target hash value and a de-duplication hash table are then used to determine whether to perform a de-duplication operation on the target data block. If the compression ratio of this target data block is greater than or equal to the threshold compression ratio, a group compression attempt is made. With this method, the amount of data that need to be transferred from a fast storage device to a slow storage device can be reduced, and the storage space of the storage devices can be improved, thus increasing the resource utilization and improving the user experience.

The embodiments of the present disclosure will be further described in detail below with reference to the accompanying drawings, wherein FIG. 1 illustrates an example environment in which a device and/or a method according to an embodiment of the present disclosure can be implemented.

As shown in FIG. 1, example environment 100 includes computing device 102, wherein computing device 102 may be used to manage or control the transfer of data between storage device 104 and storage device 106. For example, computing device 102 is used to perform de-duplication and transfer operations on data transferred from storage device 104 to storage device 106. Example computing device 102 includes, but is not limited to, a personal computer, a server computer, a handheld or laptop device, a mobile device, a multiprocessor system, a consumer electronic product, a minicomputer, a mainframe computer, a distributed computing environment including any of the above systems or devices, and the like. When using storage devices 104 and 106, storage device 104 may be used as an upper-level storage device, and storage device 106 may be used as a lower-level storage device.

Storage device 104 may also be referred to as a first storage device, which is a high-performance storage device with a short device access time. For example, storage device 104 may be a flash memory or an SSD. Storage device 104 includes physical block 110. Physical block 110 is a physical region on the storage device where data is stored. Physical block 110 is used to store a plurality of compressed data blocks, such as compressed data block 112. FIG. 1 illustrates storage device 104 including one physical block 110, which is only an example and not a specific limitation to the present disclosure. Storage device 104 may include any suitable number of physical blocks.

Computing device 102 may check a physical block in storage device 104 according to a certain policy to determine whether data blocks included within this physical block are to be transferred to physical block 114 in storage device 106. In one example, computing device 102 is configured to check at a certain time period whether data in a physical block in storage device 104 needs to be transferred to storage device 106. In another example, computing device 102 is configured to check, when there is a light service load, whether data in a physical block in storage device 104 needs to be transferred to storage device 106. The above examples are only intended to describe the present disclosure, and are not intended to specifically define the present disclosure.

Computing device 102, after starting to look for physical blocks based on certain policy configurations, finds, from a plurality of physical blocks in storage device 104, a physical block that meets certain criteria to perform transfer of data blocks. For example, the heat of a physical block is used to determine whether to transfer data blocks in that physical block. When it is determined that the data blocks in physical block 110 are to be transferred to a physical block in storage device 106, a de-duplication check may be performed on the data to determine whether the data needs to be transferred to storage device 106, for example, using de-duplication hash table 108 acquired by computing device 102. If the data can be de-duplicated during the de-duplication check, the amount of data transferred to storage device 106 is reduced. If no de-duplication processing is performed on data blocks to be transferred, a group compression attempt may then be made to see whether the data can be further compressed. If the result of the group compression can meet a threshold requirement, the group-compressed data can be transferred to storage device 106, or if the effect of the group compression is not good, the data blocks can be compressed separately and then transferred to storage device 106.

Storage device 106 is also referred to as a second storage device, which is composed of a low-performance storage device and has a long device access time. Storage device 104 has a shorter device access time than storage device 106. For example, storage device 106 may be an HDD. The above examples are only intended to describe the present disclosure, and are not intended to specifically define the present disclosure. FIG. 1 illustrates storage device 106 including one physical block 114, which is only an example and not a specific limitation to the present disclosure, and storage device 106 may include any number of physical blocks.

With this method, the amount of data that need to be transferred from a fast storage device to a slow storage device can be reduced, and the storage space of the storage devices can be improved, thus increasing the resource utilization and improving the user experience.

An example environment in which a device and/or a method of embodiments of the present disclosure can be implemented is described above in conjunction with FIG. 1, and a schematic diagram of example 200 in which data blocks are compressed into a physical block according to an embodiment of the present disclosure is described below in conjunction with FIG. 2.

Figure 2:
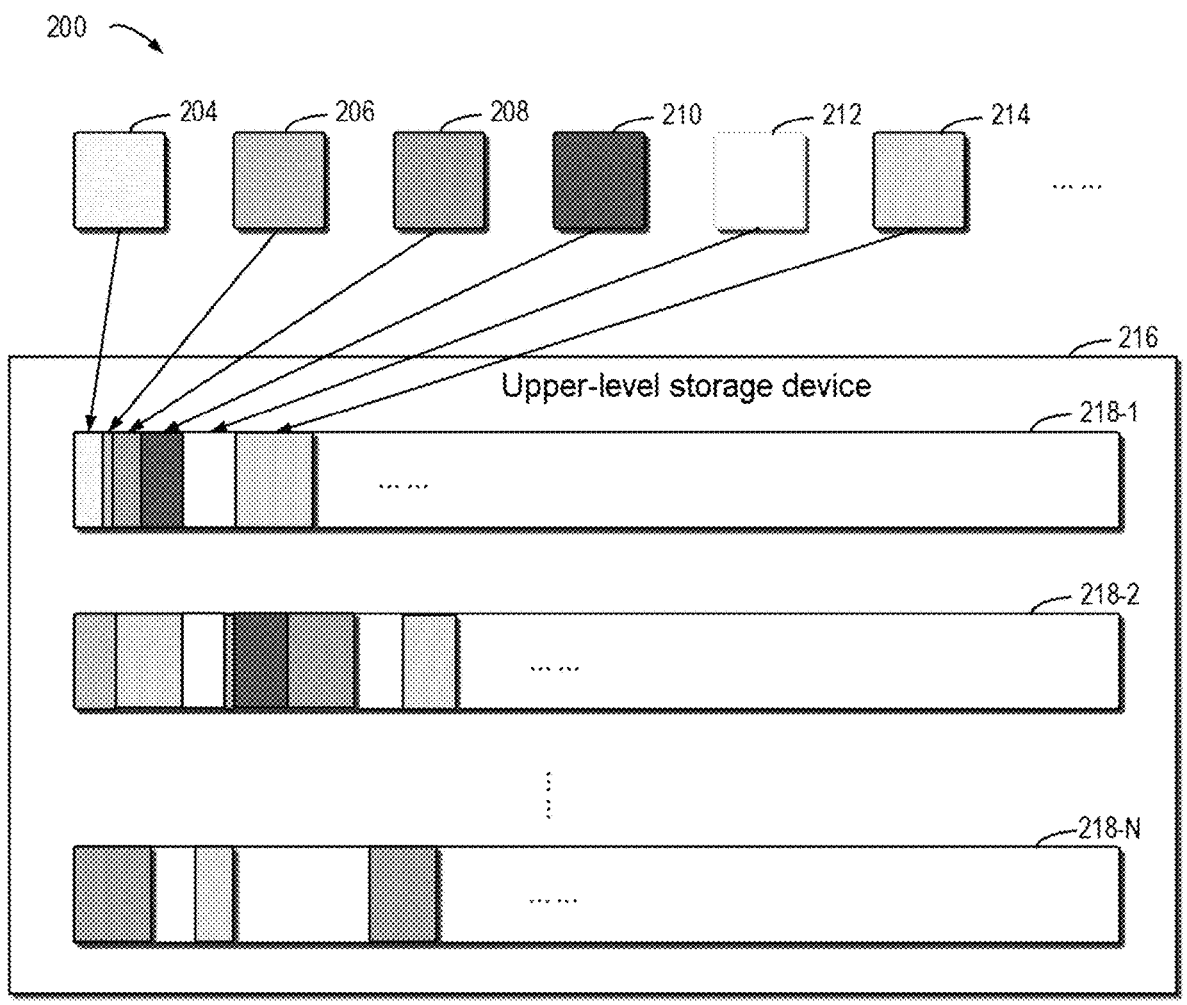
FIG. 2 illustrates a schematic diagram of an example in which data blocks are compressed into a physical block according to an embodiment of the present disclosure.

As shown in FIG. 2, upper-level storage device 216 includes physical block 218-1, physical block 218-2, . . . , and physical block 218-N, with N being a positive integer, which may also be referred to as physical blocks 218 for ease of description. In FIG. 2, data blocks 204, 206, 208, 210, 212, 214, etc., for storage in physical block 218 are illustrated. The storage system processes data in a unit of data blocks. Data blocks 204, 206, 208, 210, 212, 214, etc., are compressed and then stored in physical block 218.

Figure 3:
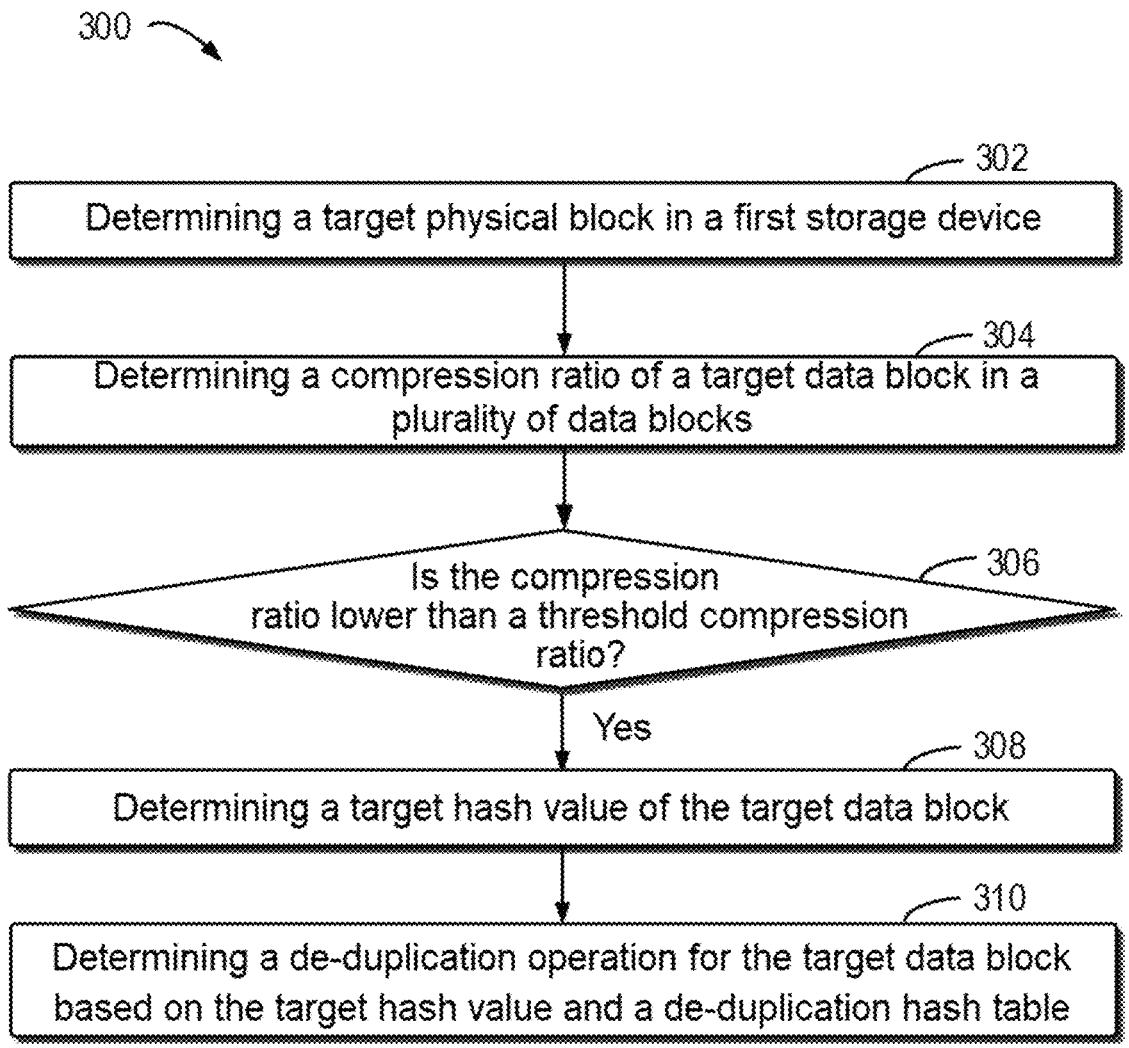
FIG. 3 illustrates a flow chart of a method for de-duplicating data according to an embodiment of the present disclosure.

FIG. 2 above describes a schematic diagram of an example in which data blocks are compressed into a physical block of an embodiment of the present disclosure, and a schematic diagram of de-duplication of data is further described below in conjunction with FIG. 3, wherein FIG. 3 illustrates a flow chart of a method for de-duplicating data according to an embodiment of the present disclosure. The method in FIG. 3 may be performed on computing device 102 in FIG. 1 or any suitable computing device.

At block 302, a target physical block in a first storage device is determined, a plurality of data blocks in the target physical block being to be transferred to a second storage device. Computing device 102, for example, determines target physical block 110. The first storage device has a shorter device access time than the second storage device.

In some embodiments, the computing device first finds from first storage device 104 physical blocks therein as candidate physical blocks, and then selects from the candidate physical blocks a candidate physical block that meets the condition as the target physical block from which data is to be transferred. Specifically, when determining the target physical block, it is necessary to first determine the heat of a candidate physical block in the first storage device, the heat indicating how frequently the candidate physical block is accessed. In some embodiments, the heat of the candidate physical block is the number of times the candidate physical block has been accessed as recorded. In some embodiments, the heat of the candidate physical block is determined using the heat of each data block in the candidate physical block. In one example, the average of the heats of the data blocks in the candidate physical block is used as the heat of the candidate physical block. In another example, the sum of the heats of the data blocks in the candidate physical block is used as the heat of the candidate physical block. The above examples are only intended to describe the present disclosure, and are not intended to specifically define the present disclosure. It is then determined whether the heat of the candidate physical block is less than a threshold heat. When the heat of the candidate physical block is less than the threshold heat, it indicates that data in the physical block is not frequently accessed, and the data in the physical block can be transferred to a lower-level storage device in order to improve the resource utilization of the fast storage device. In this case, the candidate physical block is determined as the target physical block. If it is greater than or equal to the threshold heat, it indicates that the physical block is accessed frequently, data blocks in this candidate physical block do not need to be transferred, and therefore, the candidate physical block is not determined as the target physical block. In this manner, a physical block that requires data transfer can be quickly and accurately determined.

In some embodiments, when the computing device determines the target physical block, computing device 102 first determines the storage density of the candidate physical block in the first storage device, the storage density indicating the extent to which the candidate physical block is utilized. For example, some physical blocks have many voids, which is not conducive to data storage. If the storage density of the candidate physical block is lower than a threshold storage density, it indicates that the data stored in the physical block is scattered and has many voids, and the candidate physical block can be determined as the target physical block for data block transfer, thereby providing more storage space for the upper-level storage device. If the storage density of the candidate physical block is higher than or equal to the threshold storage density, it indicates that the physical block utilization is high, and the data in the candidate physical block does not need to be processed. In this manner, a physical block that requires data transfer can be quickly and accurately determined. The above examples are intended to describe the present disclosure only and are not a specific limitation to the present disclosure, and the person skilled in the art may select the target physical block in other suitable manners, or may combine the above examples.

At block 304, a compression ratio of a target data block in the plurality of data blocks is determined. Computing device 102 performs de-duplication or data transfer starting with a data block that begins in the physical block. When processing each data block, it is necessary to analyze the compression ratio of that data block, where the compression ratio is determined from the original data block size/the compressed size. For example, if the original data size is 8 M and the compressed data block size is 1 M, then the compression ratio is 8.

In some embodiments, the computing device may first acquire metadata of the target data block. The size of physical space that is actually occupied by the data block is then acquired from that metadata. The data block in the physical block can then also be decompressed to obtain the original size of that data block. The original size and the size of the physical space that is actually occupied are then used to determine the compression ratio. In some embodiments, a compression algorithm typically has a certain compression ratio, and the compression ratio of the data block can be determined according to the compression algorithm employed on the data block. The above examples are only intended to describe the present disclosure, and are not intended to specifically define the present disclosure.

At block 306, it is determined whether the compression ratio of the target data block is lower than a threshold compression ratio. In the present disclosure, the size of the de-duplication hash table for the data blocks to be transferred to the lower-level storage device is limited, and in order to reduce the amount of data to be transferred to the lower-level storage device, the de-duplication hash table is typically used to store hash values of data blocks with a low data compression ratio. The compression ratio is discriminated to determine whether to carry out de-duplication or to make a group compression attempt. If the compression ratio is higher than or equal to the threshold compression ratio, a group compression attempt is made on the data block, which will be further described later. If the compression ratio is lower than the threshold compression ratio, then at block 308, a target hash value of the target data block is determined. For example, computing device 102 performs a hash calculation on the target data block to determine the hash value of the target data block. For example, the hash algorithm SHA0, SHA1, or MD5 is used to calculate the hash value.

At block 310, a de-duplication operation for the target data block is determined based on the target hash value and the de-duplication hash table. The de-duplication hash table stores hash values of data blocks that have been transferred from the first storage device to the second storage device. Computing device 102 compares the target hash value of the target data block with the de-duplication hash table to perform the de-duplication operation on the target data block.

In some embodiments, when determining the de-duplication operation, computing device 102 first determines whether the target hash value exists in the de-duplication hash table. If the target hash value exists in the de-duplication hash table, it indicates that the target data block has previously been stored to the lower-level storage device, so the target data block is de-duplicated without further data transfer from that target data block. If the hash value does not exist in the de-duplication hash table, computing device 102 needs to transfer the target data block to the second storage device, for example, by making a group compression attempt on the data block as described below. Further, the computing device adds the target hash value to the de-duplication hash table for use in subsequent data block transfer. In this way, fast de-duplication of data blocks can be achieved, thus improving the efficiency of data processing.

In some embodiments, when determining the de-duplication operation, computing device 102 first determines a plurality of logically contiguous data blocks based on the target data block. The plurality of logically contiguous data blocks use the target data block as the starting data block. For example, if it is determined based on the metadata of the target data block that it has a contiguous data block at that target physical block or at that upper-level storage device, counting starts from that target data block, and if a contiguous data block is found, the number is incremented so that a plurality of data blocks are found. Further, computing device 102 also needs to determine hash values of other data blocks following the target data block in the plurality of logically contiguous data blocks. The computing device then compares the hash values of the plurality of logically contiguous data blocks with the de-duplication hash table to determine from the plurality of logically contiguous data blocks a group of logically contiguous data blocks starting from the target data block, hash values of the group of logically contiguous data blocks hitting data blocks in the de-duplication hash table that are located in contiguous physical space. For example, the number of data blocks in the group is M. In one example, the contiguous physical space is the physical space within the same physical block. It is determined whether the number M of data blocks in the group of logically contiguous data blocks exceeds a threshold number. If the number M exceeds the threshold number, it indicates that the group of logically contiguous data blocks have previously been transferred to the lower-level storage device, and therefore, de-duplication is performed on the group of logically contiguous data blocks at this time. If the number M does not exceed the threshold number, the de-duplication processing is no longer carried out on a group basis, but instead de-duplication checks are performed on single data blocks. Therefore, the computing device determines whether the target hash value exists in the de-duplication hash table, and if the target hash value exists in the de-duplication hash table, de-duplication is performed on the target data block. If the target hash value does not exist in the de-duplication hash table, a group compression attempt is made on the target data block.

In the case where the compression ratio of the target data block is greater than or equal to the first threshold compression ratio, or the compression ratio of the target data block is less than the first threshold compression ratio but the hash value of this target data block does not exist in the de-duplication hash table, the target data block is transferred to the second storage device. During this transfer, a group compression attempt may be made. When making the group compression attempt, computing device 102 forms a predetermined number of data blocks to be transferred to the second computing device into a group, and then compresses the group of data blocks as a whole to determine the group compression ratio. Next, the computing device determines whether the group compression ratio is greater than a second threshold compression ratio. If the group compression ratio is greater than the second threshold compression ratio, it indicates that the group compression has a good effect and can reduce the transferred data, and the computing device transfers the compressed group of data blocks to the second storage device. If the group compression ratio is less than or equal to the second threshold compression ratio, it indicates that the effect of the group compression is not satisfactory. At this point, the computing device decompresses the compressed group of data blocks, and then compresses the target data block in the decompressed group of data blocks alone. After the compression is completed, the computing device transfers the separately compressed data block to the second storage device. In this way, the amount of data transferred can be reduced, and the efficiency of data processing can be improved.

Further, when the compression ratio of the data block is less than the first threshold compression ratio but the hash value of this target data block does not exist in the de-duplication hash table, the hash value of the target data block is also added to the de-duplication hash table. For the de-duplication hash table, if the position of a data block therein has changed, the de-duplication hash table needs to be updated. If the de-duplication hash table is full, a variety of policies can be employed to adjust the de-duplication hash table, for example, using the first-in-first-out policy, the least-frequently used (LFU) policy, the least recently used (LRU) policy, or other policies. After processing this target data block, data transfer is then performed in the above manner for other data blocks in the target physical block that have not yet been processed.

With this method, the amount of data that need to be transferred from a fast storage device to a slow storage device can be reduced, and the storage space of the storage devices can be improved, thus increasing the resource utilization and improving the user experience.

FIG. 3 above describes a flow chart of a method for de-duplicating data of an embodiment of the present disclosure, and an example flow chart for de-duplicating data is further described below in conjunction with FIG. 4, wherein the method in FIG. 4 may be performed on computing device 102 of FIG. 1 or any suitable computing device.

Figure 4:
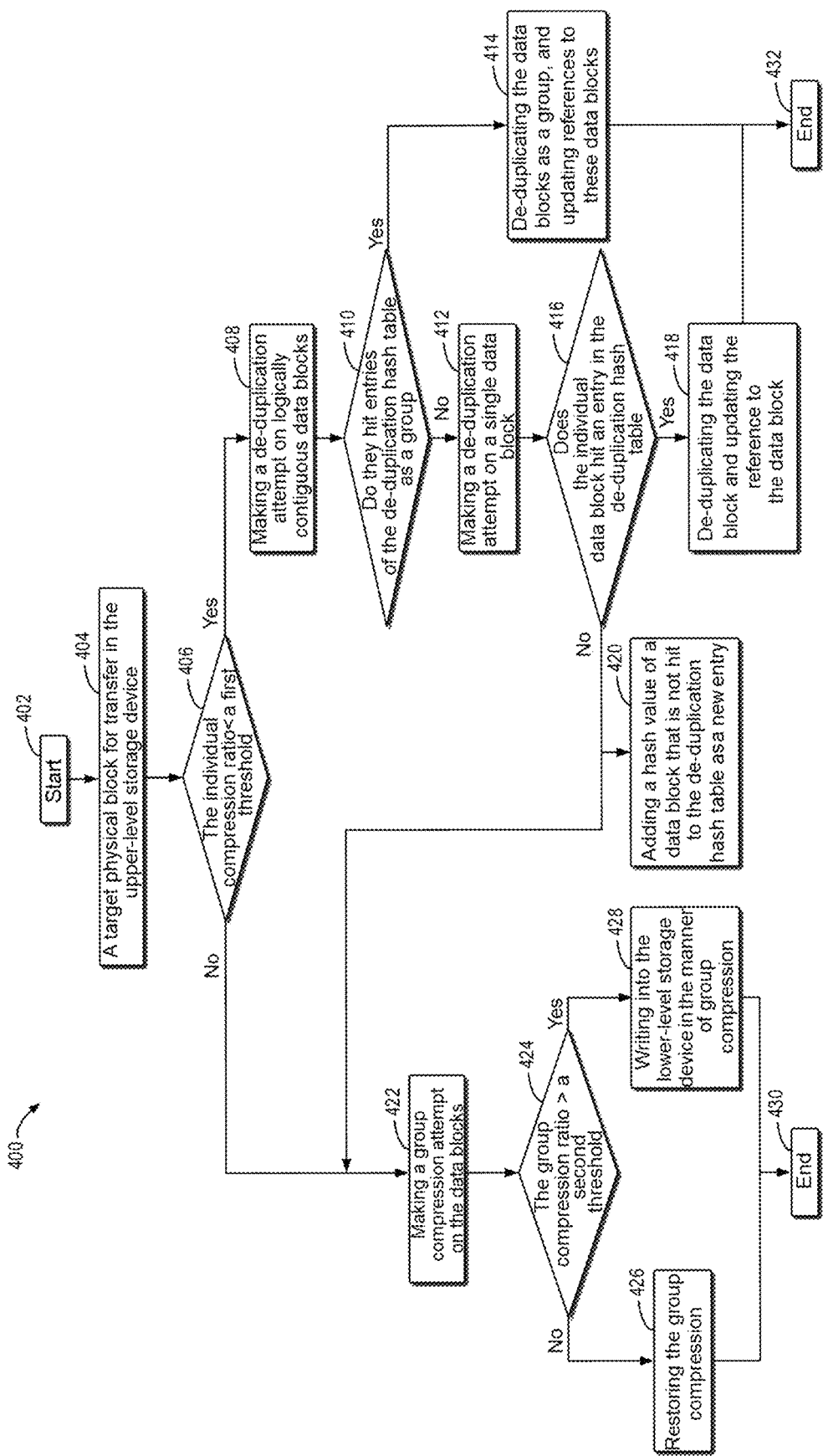
FIG. 4 illustrates a flow chart of an example of de-duplicating data according to an embodiment of the present disclosure.

As shown in FIG. 4, the transfer of data in a hybrid storage system including an upper-level storage device and a lower-level storage device begins at block 402. At block 404, computing device 102 needs to determine a target physical block for transfer in the upper-level storage device, for example, based on whether the heat of a candidate physical block exceeds a threshold heat. For example, the heat of the candidate physical block can be determined by heats of data blocks stored therein, such as the average of heats of the data blocks stored in the candidate physical block or the sum of heats of the data blocks. In this way, a plurality of target physical blocks PB[n] can be determined, n=1, 2, . . . , M, where M is a positive integer. At block 406, for each data block X in the target physical block n, the individual compression ratio of the data block X needs to be calculated. The individual compression ratio can be determined from the size of the physical space for storage as recorded in metadata of the data block and the original size of the data block after decompression. It is then determined at block 406 whether the individual compression ratio is less than a first threshold. If the individual compression ratio is less than the first threshold, it indicates that the data block cannot be effectively compressed, and a hash value of the data block needs to be calculated. Then, a group de-duplication attempt is made on that data block. For example, at block 408, a de-duplication attempt is made on logically contiguous data blocks with low compression that include this data block. Typically, the metadata of the data block stores an identifier of its logically contiguous data block. In this step, by looking up the metadata of the data block, it is determined whether the data block has a logically contiguous data block, and if so, it is then determined whether the contiguous data block also has a logically contiguous data block, until all logically contiguous data blocks are found. Next, hash values of other data blocks in that plurality of logically contiguous data blocks are calculated. Then, at block 410, the hash values of the plurality of logically contiguous data blocks are compared with the de-duplication hash table to determine whether they hit entries of the de-duplication hash table as a group. Determining whether they hit the entries of the de-duplication hash table as a group is to determine whether there is a group of logically contiguous data blocks starting with the data block to be processed, of which the number exceeds a threshold number, wherein hash values of the group of logically contiguous data blocks hit data blocks in the de-duplication hash table that are located in contiguous physical space. For example, the contiguous physical space is the physical space in the same physical block. If the number of the group of logically contiguous data blocks exceeds the threshold number, it indicates that this group of data has previously been transferred to contiguous physical space in the lower-level storage device. Therefore, at block 414, the logically contiguous data blocks are de-duplicated as a group, where the logically contiguous data blocks are in a physical block or the upper-level storage device and do not need to be transferred to the lower-level storage device, and then references to these data blocks are updated, for example, updating references to the data blocks using the locations of storage of the data blocks in the hash table. After completing the above operation, the operations on that data block end at block 432.

If, after the hash value lookup, a group of logically contiguous data blocks of which the number exceeds the threshold number cannot be found, that is, a group of logically contiguous data blocks of which the number exceeds the threshold number and of which the hash values hit data blocks in the de-duplication hash table that are located in contiguous physical space cannot be found starting from the data block to be processed, a de-duplication attempt is made at block 412 on a single data block and, at block 416, it is determined whether a non-contiguous individual data block hits an entry in the de-duplication hash table. If hit, at block 418, the data block is de-duplicated and does not need to be transferred to the lower-level storage device, and the reference to the data block is updated. If not hit, the operation therefor is the same as that when the result of comparison is no at block 406, at which point, at block 422, a group compression attempt is made on the data block, in which case the group compression attempt needs to be performed when data blocks of which the number meets a group number are received. Then, at block 424, computing device 102 determines whether the group compression ratio is greater than a second threshold. If the group compression ratio is greater than the second threshold, it indicates a good compression result, at which point the data blocks are written into the lower-level storage device in the manner of group compression at block 428. Otherwise, at block 426, the group compression is restored, and the data blocks are written into the lower-level storage device in a non-group compression manner. For example, the data blocks are individually compressed and then transferred to the lower-level storage device. The above operations are then repeated for the data that follow until they end at block 430. In order to reduce the number of data blocks to be transferred and with low compression, when the data block has an individual compression ratio less than the first threshold and has not been subjected to the de-duplication operation, the hash value of a data block which is not hit is generated at block 420 and added to the de-duplication hash table as a new entry, and the storage address of that data block in the hash entry for it is updated to the storage address in the lower-level storage device.

With this method, the amount of data that need to be transferred from a fast storage device to a slow storage device can be reduced, and the storage space of the storage devices can be improved, thus increasing the resource utilization and improving the user experience.

FIG. 4 above describes an example flow chart for de-duplicating data of an embodiment of the present disclosure, and a schematic diagram of an example of data transfer according to an embodiment of the present disclosure is further described below in conjunction with FIG. 5.

Figure 5:
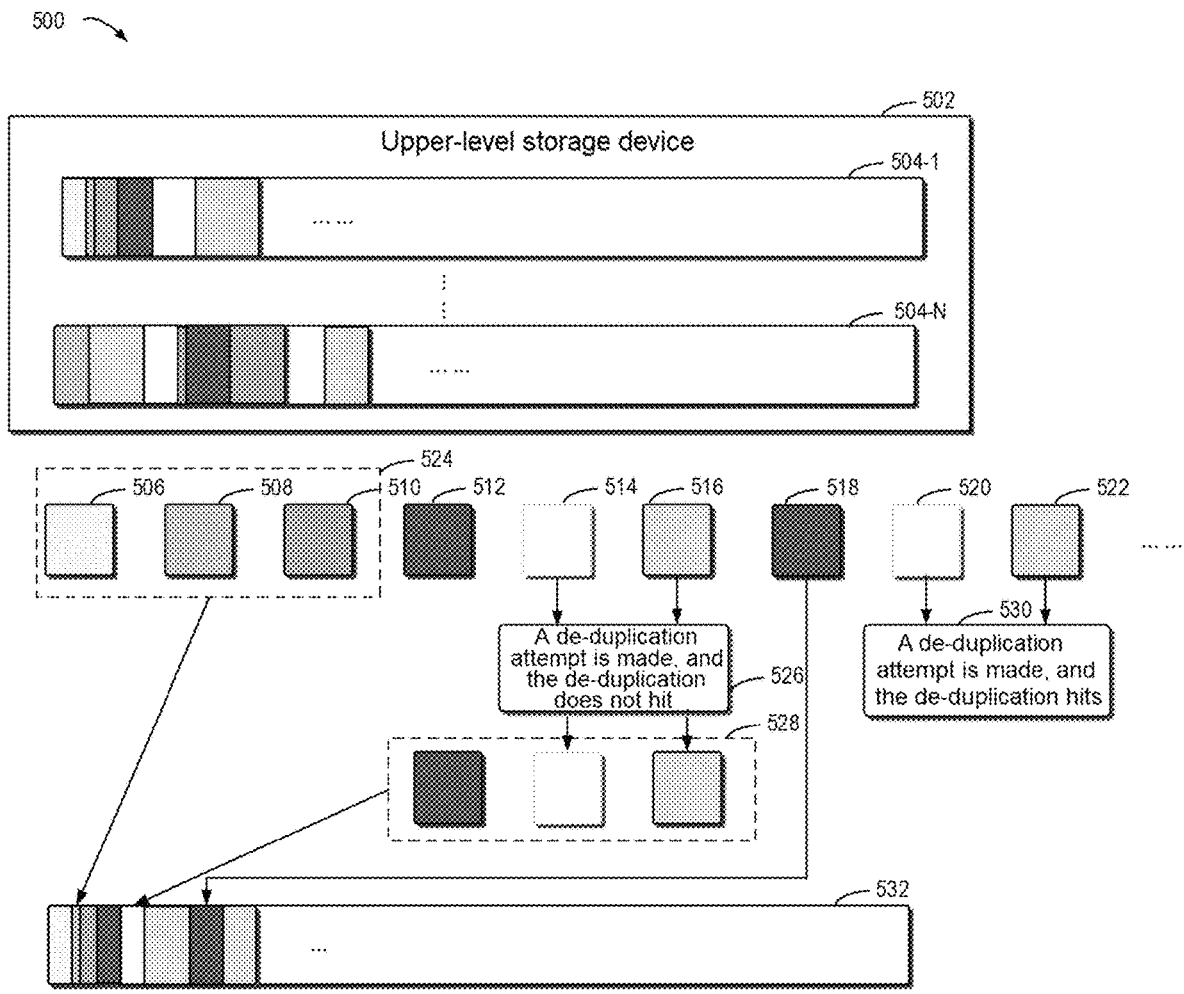
FIG. 5 illustrates a schematic diagram of an example of data transfer according to an embodiment of the present disclosure.

As shown in FIG. 5, upper-level storage device 502 includes physical blocks 504-1, ..., and 504-N, which may also be referred to as physical blocks 504 for ease of description. These physical blocks 504 include a plurality of data blocks 506, 508, 510, 512, 514, 516, 518, 520, 522, and so on. Among them, data blocks 506, 508, and 510 have large compression ratios and form group 524 for a group compression attempt, and the effect of group compression meets the requirements, so after group compression, they are stored into physical block 532 of the lower-level storage device. For data blocks 514 and 516, in block 526, a de-duplication attempt is made, but the de-duplication does not hit, then by combining with data block 512, group 528 is formed for a group compression attempt, and they are stored into physical block 532 after the result of group compression meets the requirements. For data block 518, it is subjected to individual compression and then stored into physical block 532. For data blocks 520 and 522, a de-duplication attempt is made in block 530 for these two data blocks, and the de-duplication hits. Thus, the two data blocks are removed directly without data block transfer.

With this method, the amount of data that need to be transferred from a fast storage device to a slow storage device can be reduced, and the storage space of the storage devices can be improved, thus increasing the resource utilization and improving the user experience.

Figure 6:
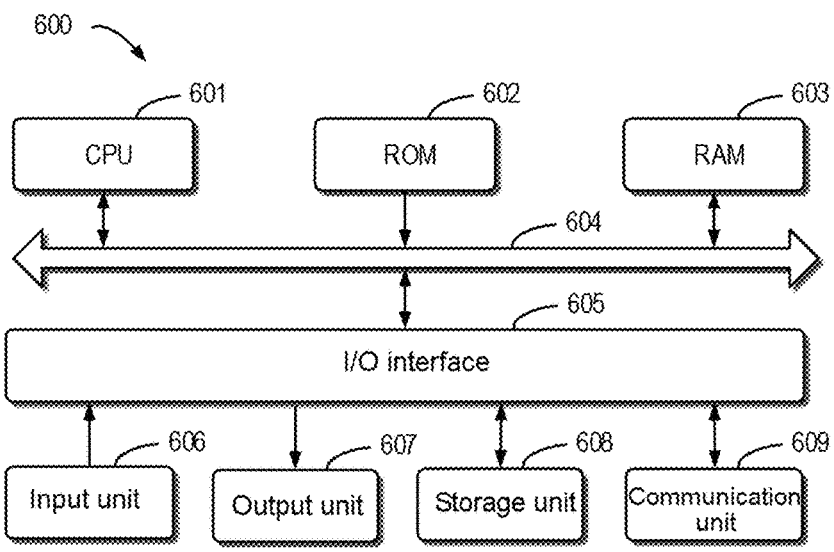
FIG. 6 illustrates a schematic block diagram of an example device suitable for implementing embodiments of the present disclosure.

FIG. 6 illustrates a schematic block diagram of example device 600 that may be used to implement embodiments of the present disclosure. Computing device 102 in FIG. 1 can be implemented using device 600. As shown in the figure, device 600 includes central processing unit (CPU) 601 that may execute various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

The various processes and processing described above, for example, methods 300 and 400, may be executed by processing unit 601. For example, in some embodiments, methods 300 and 400 may be implemented as a computer software program that is tangibly included in a machine-readable medium such as storage unit 608. In some embodiments, part of or all the computer program may be loaded and/or installed onto device 600 via ROM 602 and/or communication unit 609. When the computer program is loaded into RAM 603 and executed by CPU 601, one or more actions of methods 300 and 400 described above may be executed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or technical improvements to technologies on the market, or to enable other persons of ordinary skill in the art to understand the embodiments disclosed here.

The invention claimed is:

1. A method for de-duplicating data, comprising:
   determining a target physical block in a first storage device, a plurality of data blocks in the target physical block being to be transferred to a second storage device;
   determining a compression ratio of a target data block in the plurality of data blocks;
   determining a target hash value of the target data block in response to the compression ratio being lower than a threshold compression ratio; and
   determining a de-duplication operation for the target data block based on the target hash value and a de-duplication hash table, the de-duplication hash table storing hash values of data blocks that have been transferred from the first storage device to the second storage device;
   wherein determining the de-duplication operation comprises:
   determining from a plurality of logically contiguous data blocks a group of logically contiguous data blocks starting from the target data block, hash values of the group of logically contiguous data blocks hitting data blocks in the de-duplication hash table that are located in contiguous physical space;
   determining whether the number of data blocks in the group of logically contiguous data blocks exceeds a threshold number; and
   de-duplicating the group of logically contiguous data blocks in response to the number exceeding the threshold number.

2. The method according to claim 1, wherein determining the target physical block comprises:
   determining a heat of a candidate physical block in the first storage device, the heat indicating how frequently the candidate physical block is accessed; and
   determining the candidate physical block as the target physical block in response to the heat being less than a threshold heat.

3. The method according to claim 1, wherein determining the target physical block comprises:
   determining a storage density of a candidate physical block in the first storage device, the storage density indicating the extent to which the candidate physical block is utilized; and
   determining the candidate physical block as the target physical block in response to the storage density being lower than a threshold storage density.

4. The method according to claim 1, wherein determining the compression ratio comprises:
   acquiring metadata of the target data block; and
   determining the compression ratio based on the metadata.

5. The method according to claim 1, wherein determining the de-duplication operation comprises:
   determining whether the target hash value exists in the de-duplication hash table; and
   de-duplicating the target data block in response to the target hash value existing in the de-duplication hash table.

6. The method according to claim 5, wherein determining the de-duplication operation further comprises:
transferring the target data block to the second storage device in response to the hash value not existing in the de-duplication hash table; and
adding the target hash value to the de-duplication hash table.

7. The method according to claim 1, wherein determining the de-duplication operation further comprises:
determining the plurality of logically contiguous data blocks based on the target data block, the plurality of logically contiguous data blocks taking the target data block as a starting data block; and
determining hash values of other data blocks following the target data block in the plurality of logically contiguous data blocks.

8. The method according to claim 7, wherein determining the de-duplication operation further comprises:
determining, in response to the number not exceeding the threshold number, whether the target hash value exists in the de-duplication hash table; and
de-duplicating the target data block in response to the target hash value existing in the de-duplication hash table.

9. The method according to claim 1, wherein the threshold compression ratio is a first threshold compression ratio, and the method further comprises:
transferring the target data block to the second storage device in response to the compression ratio being greater than or equal to the first threshold compression ratio.

10. The method according to claim 9, wherein transferring the target data block to the second storage device comprises:
generating a group of data blocks comprising the target data block;
compressing the group of data blocks as a whole to determine a group compression ratio;
determining whether the group compression ratio is greater than a second threshold compression ratio; and
transferring the compressed group of data blocks to the second storage device in response to the group compression ratio being greater than the second threshold compression ratio.

11. The method according to claim 10, further comprising:
decompressing the compressed group of data blocks in response to the group compression ratio being less than or equal to the second threshold compression ratio;
compressing the target data block in the decompressed group of data blocks alone; and
transferring the compressed target data block to the second storage device.

12. The method according to claim 1, wherein the first storage device has a shorter device access time than the second storage device.

13. An electronic device, comprising:
at least one processor; and
a memory coupled to the at least one processor and having instructions stored therein, wherein the instructions, when executed by the at least one processor, cause the device to perform actions comprising:
determining a target physical block in a first storage device, a plurality of data blocks in the target physical block being to be transferred to a second storage device;
determining a compression ratio of a target data block in the plurality of data blocks;
determining a target hash value of the target data block in response to the compression ratio being lower than a threshold compression ratio; and
determining a de-duplication operation for the target data block based on the target hash value and a de-duplication hash table, the de-duplication hash table storing hash values of data blocks that have been transferred from the first storage device to the second storage device;
wherein determining the de-duplication operation comprises:
determining from a plurality of logically contiguous data blocks a group of logically contiguous data blocks starting from the target data block, hash values of the group of logically contiguous data blocks hitting data blocks in the de-duplication hash table that are located in contiguous physical space;
determining whether the number of data blocks in the group of logically contiguous data blocks exceeds a threshold number; and
de-duplicating the group of logically contiguous data blocks in response to the number exceeding the threshold number.

14. The electronic device according to claim 13, wherein determining the target physical block comprises:
determining a heat of a candidate physical block in the first storage device, the heat indicating how frequently the candidate physical block is accessed; and
determining the candidate physical block as the target physical block in response to the heat being less than a threshold heat.

15. The electronic device according to claim 13, wherein determining the target physical block comprises:
determining a storage density of a candidate physical block in the first storage device, the storage density indicating the extent to which the candidate physical block is utilized; and
determining the candidate physical block as the target physical block in response to the storage density being lower than a threshold storage density.

16. The electronic device according to claim 13, wherein determining the compression ratio comprises:
acquiring metadata of the target data block; and
determining the compression ratio based on the metadata.

17. The electronic device according to claim 13, wherein determining the de-duplication operation comprises:
determining whether the target hash value exists in the de-duplication hash table; and
de-duplicating the target data block in response to the target hash value existing in the de-duplication hash table.

18. The electronic device according to claim 17, wherein determining the de-duplication operation further comprises:
transferring the target data block to the second storage device in response to the hash value not existing in the de-duplication hash table; and
adding the target hash value to the de-duplication hash table.

19. The electronic device according to claim 13, wherein determining the de-duplication operation further comprises:
determining plurality of logically contiguous data blocks based on the target data block, the plurality of logically contiguous data blocks taking the target data block as a starting data block; and
determining hash values of other data blocks following the target data block in the plurality of logically contiguous data blocks.

20. A computer program product having a non-transitory computer readable medium which stores a set of instructions to de-duplicate data; the set of instructions, when carried out by computerized circuitry, causing the computerized circuitry to perform a method of:

determining a target physical block in a first storage device, a plurality of data blocks in the target physical block being to be transferred to a second storage device;

determining a compression ratio of a target data block in the plurality of data blocks;

determining a target hash value of the target data block in response to the compression ratio being lower than a threshold compression ratio; and determining a de-duplication operation for the target data block based on the target hash value and a de-duplication hash table, the de-duplication hash table storing hash values of data blocks that have been transferred from the first storage device to the second storage device;

wherein determining the de-duplication operation comprises:

determining from a plurality of logically contiguous data blocks a group of logically contiguous data blocks starting from the target data block, hash values of the group of logically contiguous data blocks hitting data blocks in the de-duplication hash table that are located in contiguous physical space;

determining whether the number of data blocks in the group of logically contiguous data blocks exceeds a threshold number; and de-duplicating the group of logically contiguous data blocks in response to the number exceeding the threshold number.

* * * * *